United States Patent
Seeds et al.

(10) Patent No.: US 8,090,658 B2
(45) Date of Patent: *Jan. 3, 2012

(54) SYSTEM AND METHOD OF MEMBER UNIQUE NAMES

(75) Inventors: Glen Seeds, Ottawa (CA); David Cushing, Osgoode (CA); Henk Cazemier, Spencerville (CA)

(73) Assignee: International Business Machines Corporation, Armonk, NY (US)

( * ) Notice: Subject to any disclaimer, the term of this patent is extended or adjusted under 35 U.S.C. 154(b) by 1290 days.

This patent is subject to a terminal disclaimer.

(21) Appl. No.: 11/473,616

(22) Filed: Jun. 23, 2006

(65) Prior Publication Data

US 2007/0299676 A1  Dec. 27, 2007

(51) Int. Cl.
- G06F 7/00 (2006.01)
- G06F 17/00 (2006.01)
- G06F 17/30 (2006.01)
- G06F 21/00 (2006.01)

(52) U.S. Cl. ............... 705/50; 707/602; 707/809

(58) Field of Classification Search ............ 707/602, 707/809, 609, 610, 611, 626, 687, 692, 812–820, 707/953–963
See application file for complete search history.

(56) References Cited

U.S. PATENT DOCUMENTS

| | | | |
|---|---|---|---|
| 6,298,342 B1 * | 10/2001 | Graefe et al. ............. | 707/602 |
| 6,397,228 B1 * | 5/2002 | Lamburt et al. ........... | 707/692 |
| 6,587,857 B1 * | 7/2003 | Carothers et al. ......... | 707/602 |
| 6,604,110 B1 * | 8/2003 | Savage et al. ............. | 707/602 |
| 6,665,683 B1 * | 12/2003 | Meltzer .................... | 707/602 |
| 6,678,691 B1 * | 1/2004 | Kikkers .................... | 707/602 |
| 6,687,693 B2 * | 2/2004 | Cereghini et al. ........ | 707/602 |
| 6,721,405 B1 * | 4/2004 | Nolting et al. ............ | 379/133 |
| 6,728,703 B1 * | 4/2004 | Wan et al. ................. | 707/602 |
| 6,768,986 B2 * | 7/2004 | Cras et al. ................ | 1/1 |
| 6,983,282 B2 * | 1/2006 | Stern et al. .............. | 707/805 |
| 7,117,215 B1 * | 10/2006 | Kanchwalla et al. ..... | 707/602 |
| 7,133,876 B2 * | 11/2006 | Roussopoulos et al. ... | 707/752 |
| 7,139,766 B2 * | 11/2006 | Thomson et al. ......... | 1/1 |
| 7,191,183 B1 * | 3/2007 | Goldstein ................. | 707/602 |
| 7,281,013 B2 * | 10/2007 | Chaudhuri et al. ....... | 707/602 |
| 7,353,231 B1 * | 4/2008 | Eslambolchi et al. ..... | 707/602 |
| 7,403,956 B2 * | 7/2008 | Vaschillo et al. ......... | 707/770 |
| 7,707,170 B2 * | 4/2010 | Boggs ....................... | 707/602 |
| 7,716,172 B2 * | 5/2010 | Anjur et al. .............. | 707/600 |
| 7,716,257 B2 * | 5/2010 | Thomson et al. ......... | 707/809 |
| 7,720,789 B2 | 5/2010 | Seeds et al. | |
| 7,720,808 B2 * | 5/2010 | Lin et al. ................. | 707/603 |

(Continued)

OTHER PUBLICATIONS

Plale, Beth. "On When Data Streams Can (and Should) be Considered a Data Resource." Oct. 2003. Indiana University, Computer Science Department. 9 pages.*

(Continued)

*Primary Examiner* — Andrew J. Fischer
*Assistant Examiner* — Nancy Le
(74) *Attorney, Agent, or Firm* — Shumaker & Sieffert, P.A.

(57) ABSTRACT

A member unique name (MUN) system and MUN translation system and method are provided. The MUN system comprises a dimension reference for defining the context in which the remaining portions of the MUN exist and a canonical business key for uniquely identifying a member across different dimensional data sources within a business enterprise. The MUN translation system comprises a translation selection module for selecting a MUN transformation and a collection of MUN transformations for transforming a MUN of a first data source into a MUN of the second data source.

12 Claims, 11 Drawing Sheets

U.S. PATENT DOCUMENTS

| | | | | |
|---|---|---|---|---|
| 7,730,011 | B1* | 6/2010 | Deninger et al. | 707/602 |
| 7,756,822 | B2* | 7/2010 | Danner et al. | 707/602 |
| 7,765,224 | B2* | 7/2010 | Li et al. | 707/760 |
| 7,774,298 | B2* | 8/2010 | Trivedi et al. | 707/600 |
| 7,797,272 | B2* | 9/2010 | Picker et al. | 707/602 |
| 7,801,844 | B2* | 9/2010 | Farmer | 707/604 |
| 7,860,902 | B2* | 12/2010 | Brendle et al. | 707/809 |
| 7,882,142 | B2* | 2/2011 | Parees et al. | 707/802 |
| 2003/0033437 | A1 | 2/2003 | Fischer et al. | |
| 2004/0034615 | A1* | 2/2004 | Thomson et al. | 707/1 |
| 2004/0158564 | A1* | 8/2004 | Collier et al. | 707/10 |
| 2005/0010550 | A1* | 1/2005 | Potter et al. | 707/1 |
| 2006/0048048 | A1 | 3/2006 | Welcker et al. | |
| 2006/0085370 | A1* | 4/2006 | Groat et al. | 707/1 |
| 2008/0086498 | A1* | 4/2008 | Sureka | 707/102 |
| 2011/0016091 | A1* | 1/2011 | Prahlad et al. | 707/654 |

OTHER PUBLICATIONS

Jensen, Mikael et al. "Specifying OLAP Cubes on XML Data." Jun. 2001. Aalborg University, Department of Computer Science. 22 pages.*

Widom, Jennifer. "Research Problems in Data Warehousing." Nov. 1995. Stanford University, Department of Computer Science. 6 pages.*

Lomet David et al. "Bulletin of the Technical Committee on Data Engineering." Dec. 2000, vol. 23 No. 4. IEEE Computer Society. 52 pages.*

Hasan, Helen et al. "Using OLAP and multidimensional data for decision making." 2001. University of Wollongong, Research Online. 9 pages.*

Jarke, Matthias et al. "Fundamentals of Data Warehouses." 2nd revised and extended edition. Jun. 2003, vol. 32, No. 2. SIGMOD Record. 2 pages.*

Golfarelli, Matteo et al. "The dimensional fact model: A conceptual model for data warehouses." University of Bologna, Italy. 32 pages.*

Liu, Jixue et al. "An Architecture for Data Warehouse systems." 1998. IEEE. 4 pages.*

Rana, Omer et al. "PaDDMAS: Parallel and Distributed Data Mining Application Suite." University of Wales Cardiff, Department of Computer Science, United Kingdom. 6 pages.*

Darmont, J. et al. "Chapter 2: Web multiform data structuring for data warehousing." ERIC, University of Lyon 2, France. 20 pages.*

Riccardo Torlone, et al.; "Design and Development of a Tool for Integrating Heterogeneous Data Warehouses"; Data Warehousing and Knowledge Discovery Lecture Notes in Computer Science; LNCS, Springer-Verlag, BE; vol. 3589, p. 105-114, 2005.

Cabibbo L, et al.; "On the Integration of Autonomous Data Marts"; Scientific and Statistical Database Management, 2004; Proceedings, 16th International Conference on Santorini Island, Greece, Jun. 21-23, 2004; Piscataway, NJ, USA, pp. 223-231.

Luca Cabibbo, et al.; "An Architecture for Data Warehousing Supporting Data Independence and Interoperability"; International Journal of Cooperative Information Systems; vol. 10, No. 3, 2001, p. 1-22.

Chuck Ballard, et al.; "Data Mart Consolidation: Getting Control of Your Enterprise Information"; IBM.COM/REDBOOKS; 2005, p. 67-116.

Cheung, et al.; "A Metadatabase-Enabled Executive Information System (Part B): Methods for Dynamic Multidimensional Data Analysis"; Decision Support Systems, Elsevier Science Publishers; Amsterdam, NL, vol. 42, No. 3, Mar. 6, 2006, p. 1599-1612.

Cheung, et al.; "A Metadatabase-Enabled Executive Information System (Part A): A Flexible and Adaptable Architecture"; Decision Support Systems, Elsevier Science Publishers; Amsterdam, NL, vol. 42, No. 3, Apr. 11, 2006, pp. 1589-1598.

Vetterli T, et al.; "Metadata Standards for Data Warehousing: Open Information Model vs. Common Warehouse Metadata"; SIGMOD Record, Special Interest Group on the Management of Data, New York, NY; vol. 29, No. 3, Sep. 2000; pp. 68-75.

Do, H. H.; Rahm, E.: "On Metadata Interoperability in Data Warehouses"; Technical Report Jan. 2000. Department of Computer Science; University of Leipzig; Mar. 2000, p. 1-21, XP002458232.

Canadian Office Action from related Canadian Application No. 2,551,033 dated Aug. 27, 2009 (4 pages).

Canadian Office Action from corresponding Canadian Application No. 2,592,561 dated Jun. 29, 2009 (4 pages).

Non-Final Office Action dated Jun. 8, 2009 from U.S. Appl. No. 11/767,252 (10 pages).

Amendment filed on Sep. 3, 2009 from U.S. Appl. No. 11/767,252 (13 pages).

Notice of Allowance dated on Dec. 28, 2009 from U.S. Appl. No. 11/767,252 (15 pages).

Interview Summary filed on Jan. 14, 2010 from U.S. Appl. No. 11/767,252 (7 pages).

* cited by examiner

SYSTEM AND METHOD OF MEMBER UNIQUE NAMES

FIELD OF THE INVENTION

The invention relates generally to data access middleware, and in particular to a system and method of member unique names.

BACKGROUND

Within large corporate data warehouses, it is common practice to assign unique identifiers, or business keys, to logical entities to facilitate the sharing and integration of data across the entire corporation. Different data source technologies provide their own mechanisms that codify the concept of business keys within their products.

A business key is unique within a given context. For example, subsidiaries have identifiers unique within a corporation. In addition, contexts can be hierarchical in nature: Offices are unique within the context of cities, which in turn are unique within their state and country.

Different data source technologies provide their own mechanisms that assign business keys to data entities (referred to simply as entities in this document). Entities are uniquely identified in different ways, depending on the technology used to store or report on the data:

Relational databases use the unique combination of the value of one or more columns in one or more relational tables to identify entities. This concept also applies to dimensionally-modeled star or snow flake schemas, such as those typically used for data warehousing applications.

Online analytic processing (OLAP) technologies identify entities (a.k.a. members in OLAP terminology) by member unique names (MUNs). Each entity in an OLAP database is assigned a MUN that is unique within a specific scope, typically that of the entire database, referred to as a cube in OLAP technology. The format of MUNs changes from one OLAP technology to another.

Business intelligence (BI) applications that author reports or analyses (list reports, cross tabs, charts) must be able to refer to entities as part of their report/analysis specifications, notably in the case of calculations and filter expressions.

To provide the expected inter-report behavior (e.g., drill-through), we must be able to convey entity values from one report/analysis (the source report) to another (the target report) while retaining the context (the business keys) of the values. In a business environment that uses a single, static data source storage technology, this is a simple task, because the storage technology applies a single convention to assign keys.

Similarly, in master/detail reports, in which a set of master records are associated with zero or more detail records, it is typical for the master and detail records to be returned by separate queries where the context for the detail query is provided by one or more values from the master query. Once again, if all data is stored in a single, static data source, the identity of each entry is easy to maintain.

Finally, the context provided by business keys is critical to reports that may be run more than once. For example, consider the common situation where a BI application involves authoring a report, saving it, and executing it at a later date. In a business environment, it is possible for the data source upon which saved reports were authored to change over time, but the saved reports must remain unaffected by changes to the underlying data source.

Challenges to the Current Paradigm

In a single-data-source environment, passing entities among reports, or even across the same report executed multiple times, is usually a simple proposition, because each entity typically has one and only one identifier or MUN. However, most business environments use multiple, dynamic data source technologies to contain their corporate data. When data is stored in multiple data source technologies, and when that data may change over time, reporting on reports presents several major challenges:

1. A single entity may have multiple identifiers or MUNs, most likely one per data source technology.
2. Data within the databases typically change over time as entities are added, deleted, and modified over time. Similarly, within a dimensional data source (relational or OLAP), an entity's position within a hierarchical ordering of entities may change over time. These changes can (and often do) cause changes to the entities' business keys and identifiers. In the presence of changing data, a saved report may contain references to entities that have changed over time and as a consequence, their identifier may have changed.
3. Disparate technologies (i.e., relational vs. OLAP) typically do not share data across the technologies very easily if at all.

To execute a report or analysis in the context of another report or analysis (e.g., drill-through or master/detail) requires that an application convert an entity's business key between its representations in the different data source technologies. This is the only way to ensure that each report references the correct entity. This is an unmanageable burden for BI applications.

In the presence of changing data, as in an active business, a saved report may contain references to entities that have changed over time and as a consequence, their business key may also have changed. Requiring BI applications to resolve these entity references is again an unmanageable burden.

Finally, requiring applications authored against one data source technology to accommodate changes to another referenced data source technology is exceptionally difficult, and is also not a reasonable expectation of most businesses.

Upgrade Challenges

In an environment of multiple data source technologies, it is common for an entire data source technology to be replaced by another technology. In such occurrences, it is necessary for all BI applications authored against the original data source technology to continue to return the correct data without modification. This means all existing reports and analyses must be modified to accommodate the new data source, which is not a simple task, and is frequently prohibitively expensive for most businesses.

An alternative to this approach is to employ a piece of middleware that maintains a map of an entity's single, corporate identifier and all of its representations in all of the supported data source technologies. Though this does address the problem, it introduces its own set of problems:

The map must be constantly maintained and updated.

The map will grow over time as it may never be possible to remove old/deleted entity references.

Resolving an entity reference, or returning an entity reference in a result set, which occurs with a high frequency, requires a map lookup and imposes sometimes severe performance penalties:

Even if each lookup in the map incurs only a small performance penalty, this overhead quickly becomes unacceptable with the large volumes associated with business applications.

If the map is stored in memory, it often consumes a very large portion of available memory.

If the map is stored even partially on disk, the impact on performance is increased.

SUMMARY OF THE INVENTION

The invention describes

A variable-format, data source-agnostic Portable Member Unique Name (PMUN), to be used by BI applications. The PMUN includes model meta data, a data source-specific identifier, and an optional canonical identifier.

A component that is able to convert a PMUN created for one data source into a PMUN for any supported data source technology, and vice versa, without the maintenance or memory problems of a MUN map or the necessity of an application containing entity identifier mapping logic. This component makes use of the business key values embedded within the PMUNs.

By use of the invention, entity identifiers saved in BI reports and analyses remain valid regardless of changes to the data within a data source or to changes in the actual underlying data source technology. In addition, BI applications are able to execute a report in the context of another report, independent of the data source technology upon which either report or analysis is authored.

In accordance with an embodiment of the present invention, there is provided a member unique name (MUN) structure for use in translating a dimensional member reference of a first report to dimensional member reference of a second report. The MUN system comprises a dimension reference for defining the context in which the remaining portions of the MUN exist and a canonical business key for uniquely identifying a member across different dimensional data sources within a business enterprise.

In accordance with another embodiment of the present invention, there is provided a member unique name (MUN) structure for translating a dimensional member reference of a first report to dimensional member reference of a second report. The MUN system comprises a dimension reference for defining the context in which the remaining portions of the MUN exist and a data source identifier (DSI) for uniquely identifying a member within a dimensional data source that implements its own unique member identifiers.

In accordance with another embodiment of the present invention, there is provided a member unique name (MUN) translation system for translating a dimensional member reference in a first report to a dimensional member reference in a second report. The MUN translation system comprises a translation selection module for selecting a MUN transformation and a collection of MUN transformations for transforming a MUN of a first data source into a MUN of the second data source.

In accordance with another embodiment of the present invention, there is provided a method of translating a dimensional member reference in a first report to a dimensional member reference in a second report. The method comprises the steps of selecting a MUN transformation and transforming a MUN of a first data source into a MUN of the second data source.

BRIEF DESCRIPTION OF THE DRAWINGS

FIG. 14 is a flowchart illustrating an example of a method applied to perform PMUN translation in the realm report to report drill through.

DETAILED DESCRIPTION

The invention describes a data-agnostic Portable Member Unique Name (PMUN) format and a component that is able to convert PMUNs created in the context of one data source technology into either a PMUN applicable to another data source technology or to a canonical format applicable to data source technologies.

The invention is intended for use within, but not limited to, environments in which one or more applications are used to author reports against multiple dimensionally-modeled data source technologies, and where:

The data source technology upon which a saved report or analysis is authored can change.

Report-to-report drill through occurs where different data source technologies are used in the two reports (source and target).

Master/detail reports in which the corresponding master and detail queries are authored against different data source technologies.

Business entities represented within a data store may be added, deleted, changed, or re-positioned within the dimensional data space.

Figure 1:
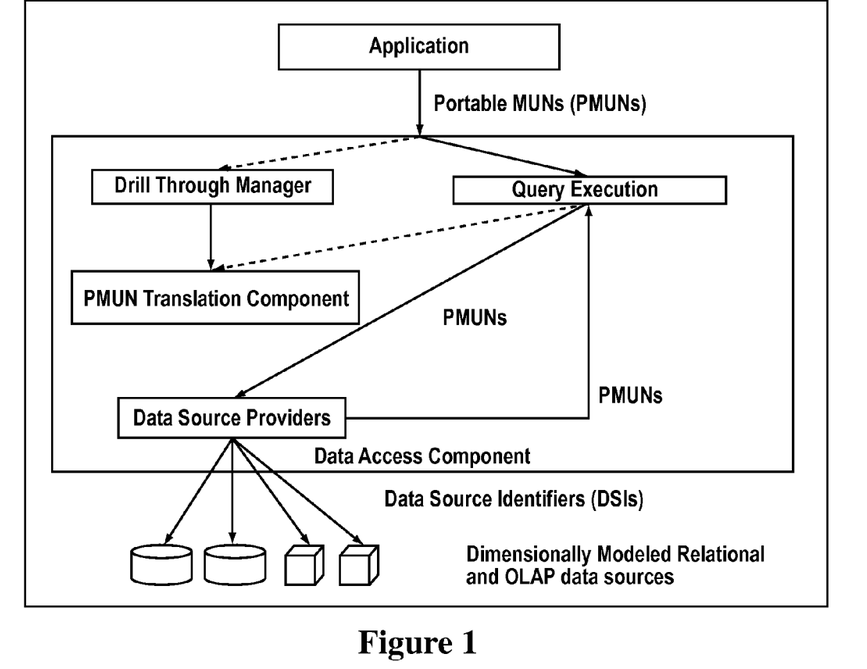
FIG. 1 is a block diagram illustrating an environment in which one or more applications are used to author reports against multiple dimensionally-modeled data source technologies.

This environment is shown in FIG. 1. Reports are authored based on PMUNs. These PMUNs are converted into Data source Specific Identifiers (DSIs) as required. Applications are unaware of the conversions between PMUNS and DSIs.

The invention is comprises two core technologies: i) a portable, data agnostic MUN (PMUN) format, and ii) a component that translates source PMUNs into target PMUNs based on source and target metadata.

PMUN Format

Figure 2:
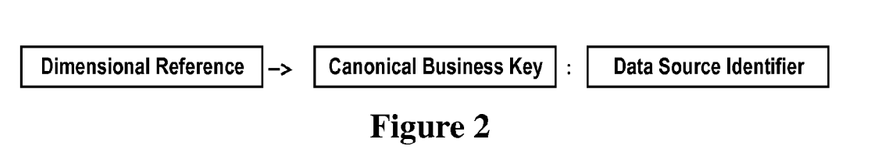
FIG. 2 is a conceptual diagram illustrating a portable member unique name (PMUN) format.

The PMUN format, as presented in FIG. 2, is a representational structure for uniquely identifying members. The format comprises three parts:

Model Information
Business Key
Data Source Specific Identifier (DSI)

The first and second components of the PMUN format are separated by the text "->". The second and third components of the PMUN format are separated by a colon (":"). The first separator is always present, but the second separator is absent if the third portion of the PMUN is not present.

A data access component, which processes metadata and data queries posed by client applications, can obtain information about the second and/or third component of a PMUN by reading the first, model-based portion of the PMUN. Depending upon the data source technology, this information may be used to interpret the business keys and/or perform query planning.

Model Information

Each PMUN is associated with a particular data model type: a hierarchy, in the case of a parent/child hierarchy; or a level, in the case of a level based hierarchy. The Model Information portion of the PMUN is mandatory section that identifies the hierarchy or level from a logical model of the underlying data sources.

Individual components of the model identifier are enclosed by square braces, '[' and ']', and separated by a period ('.'). For example, a model identifier of a level may appear as:

[My Data Source].[Offices].[By Region].[Country]

PMUNs are created initially by a data source provider. This model reference is the first part of the PMUN created for a particular business entity.

Business Key

Figure 3:
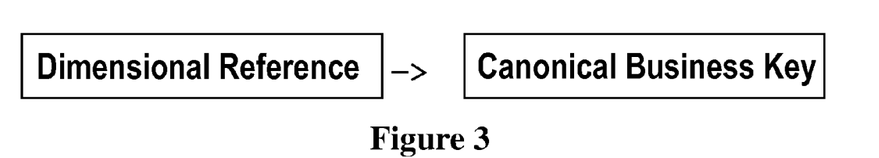
FIG. 3 is a conceptual diagram illustrating components of a dimensionally modeled relational (DMR) PMUN.

The second portion of a PMUN contains the list of business key values for a business entity and its ancestors, down to at least the first unique level of identifier within a hierarchy. The multi-part business key is required for dimensionally modeled relational (DMR) data sources, and when performing certain PMUN conversions, but is optional for OLAP data sources. The presence of the multi-part business key ensures portability of a PMUN. FIG. 3 shows the components of a DMR PMUN.

Individual business key values are enclosed by square braces and separated by periods. For example, the multi-part key of for an office may appear as:

[USA].[North Region].[Seattle].[Office 121]

Business key values from left to right represent an ancestor/descendant relationship. It is this portion of a PMUN that ensures its portability.

In the case of DMR data sources, this portion contains the values of the columns that have been identified in the model as representing the business keys for the related business entities. If a business key value in this section is empty or null, an empty business key is added as "[ ]".

In the case of OLAP data sources, this portion represents the same list of business key values, where the values of the business key are obtained from the member properties of each particular data source provider that represent business key values. These values are obtained from the member and then its ancestors until the first unique level is encountered in the hierarchy in the same fashion as for DMR data sources.

The business key portion of the PMUN is the canonical representation of a member that ensures portability of a PMUN across different data sources and across updates to a single data source. It is always present for DMR data sources, but actual implementations may choose to not populate it for OLAP data sources, in which case the creation of the portable section is deferred until it is required to perform PMUN conversion. An implementation may also choose to not support OLAP to OLAP PMUN translation, in which case the PMUN conversion is not performed at all.

The Business Key section is required for DMR data sources, but optional for OLAP data sources, though its presence ensures PMUN portability.

Figure 10:
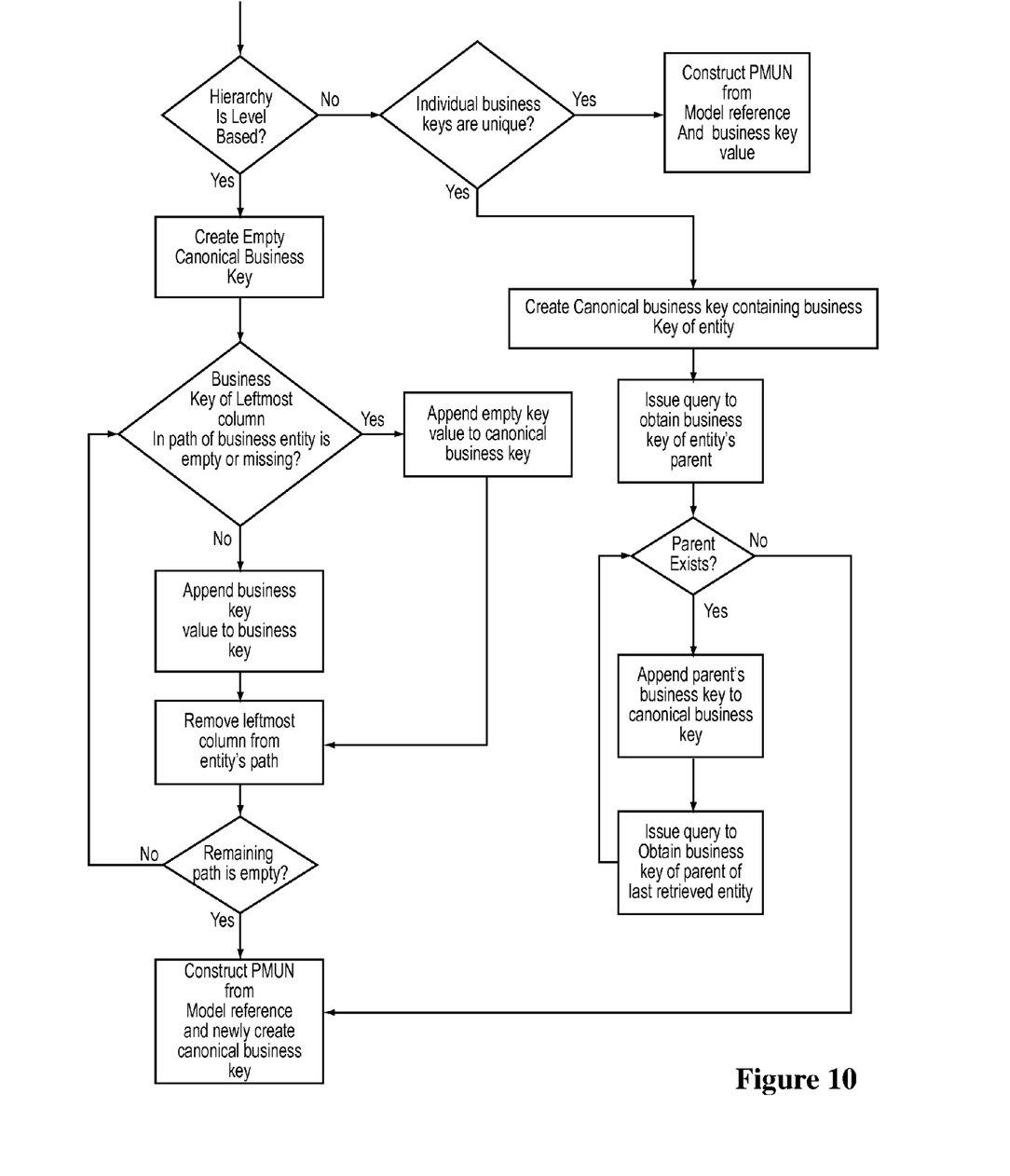
FIG. 10 is a flowchart illustrating an example of a method by which a DMR data source creates a DMR PMUN.

FIG. 10 shows in a flowchart an example of a method by which a DMR data source creates a DMR PMUN.

Data Source Specific Identifier

The optional third portion of a PMUN contains a DSI, typically a data source MUN from an OLAP provider, though this could also be an identifier from an arbitrary, metadata rich data source, such as an ERP system. This portion of the PMUN comprises an identifier of the data source technology identifier enclosed in square braces followed by a period, and then the DSI. For example, the data source-specific identifier for an office in an OLAP data source may be represented as:

[BW].[Geography ByRegion].[121]

The DSI is prefixed by a data source type to identify at a later time the origin of the data source DSI.

Figure 4:
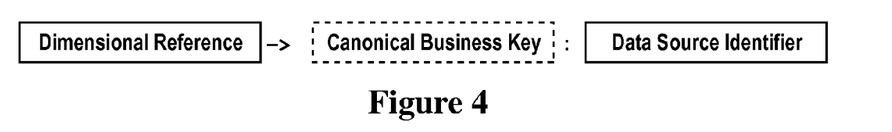
FIG. 4 is a conceptual diagram illustrating an example set of components of an online analytic processing (OLAP) PMUN.
Figure 11:
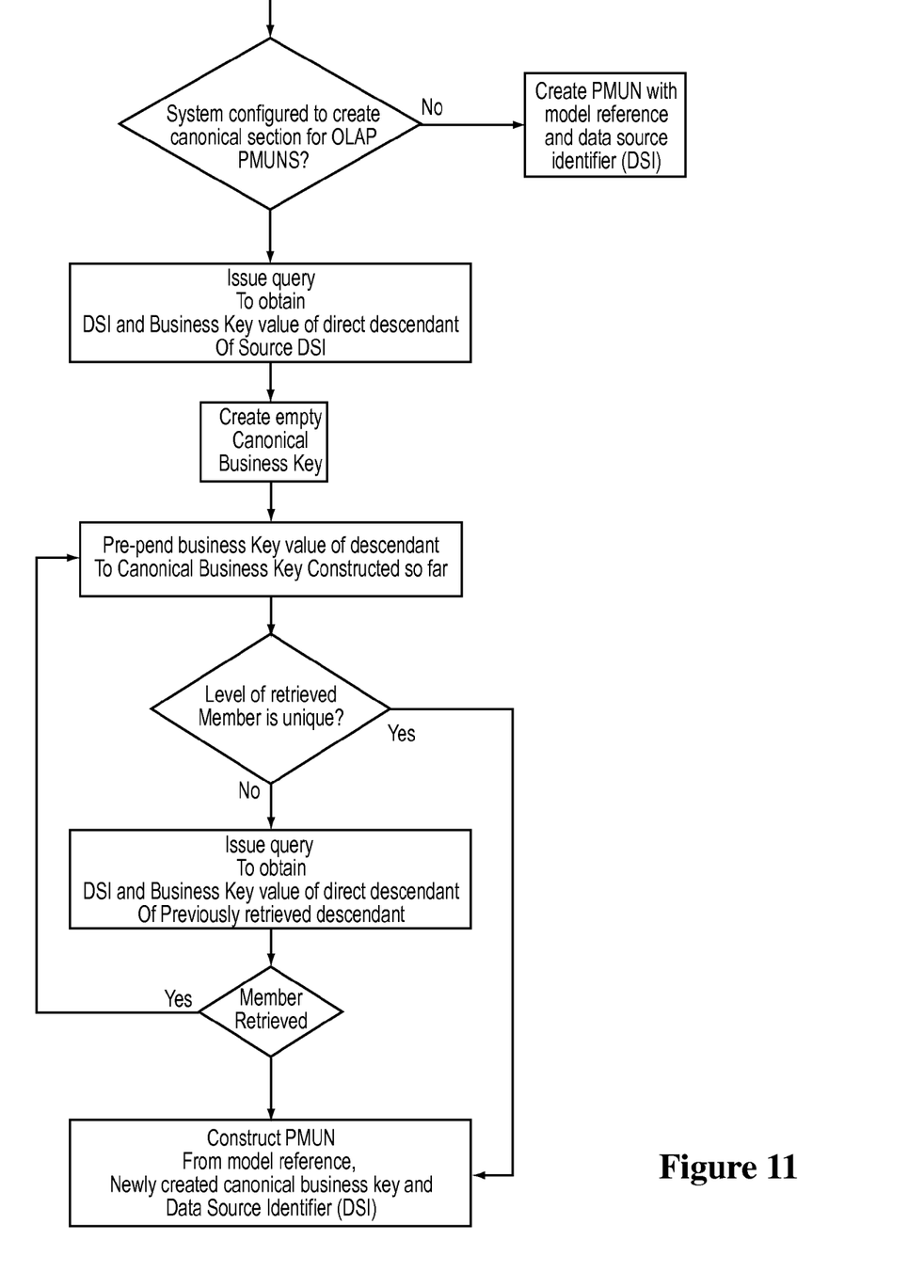
FIG. 11 is a flowchart illustrating an example of a method by which an OLAP data source provider creates an OLAP PMUN.

FIG. 4 shows in a component diagram an example of components of an OLAP PMUN. FIG. 11 shows in a flowchart an example of a method by which an OLAP data source provider creates an OLAP PMUN.

Construction and Conversion

Constructing a PMUN requires that a model exists of the dimensional data source on which the PMUN is posed. The model provides the ability to uniquely identify the following constructs within any underlying dimensional data source:

Data source
Dimension
Hierarchy
Level
Measure

PMUN Translation Component

The PMUN Translation Component (PTC) examines a PMUN and the data source to which the PMUN is being applied. If the two are compatible, the PTC component does nothing; otherwise it employs a set of operations to convert the existing PMUN into one that is appropriate for a particular data source. The PMUN conversion component also requires access to a model for each data source referenced by a PMUN.

Data Source Providers

The PTC uses a collection of data source providers that accept both data and metadata queries containing PMUNs, in a format supported by the particular data source provider. A data source provider converts a supported PMUN into a DSI and vice versa.

A DMR data source provider accepts a PMUN that contains at least the first two sections of the PMUN format (model and business key sections, respectively) and ignores the DSI section, if present.

An OLAP data source provider accepts a PMUN that contains at least the first and third sections of the PMUN format (model and DSI, respectively) and ignores the business key section, if present.

Conversion Considerations

An entity's initial PMUN is first created by a data source provider and is treated as a "black box" by components outside of the data access component. It is only within the data access component that a PMUN is actually parsed and evaluated. As a result, it is not possible for components outside of the data access component to author their own PMUNs.

The PTC can convert a PMUN created for a particular data source into an equivalent PMUN for another data source that can be consumed by data source providers within the data access component. The equivalent PMUN remains within the data access component, thus relieving the need for applications to be aware of the My conversion process.

Requirements

For the PMUN conversions to succeed, the following criteria are met:
- Each business entity has a single, common business key.
- Within a DMR data source, the columns that represent the business key for a business entity is identified as such in the model.
- Within an OLAP database, the business key for a business entity is assigned to the property used for this purpose in each particular OLAP technology.
- Hierarchies of business entities are identically constructed across data source technologies. That is, the parent/child relationships and ragged/unbalanced nature of the hierarchies are the same.

Process Examples

The MUN translation component is capable of performing the following types of PMUN conversions, which are described in detail.

| Source PMUN | Target PMUN | Is Source/Target Technology the Same? | Target Model Required? |
|---|---|---|---|
| DMR | DMR | n/a | No |
| OLAP | OLAP | Yes | No |
| OLAP | OLAP | No | Yes |
| DMR | OLAP | n/a | No |
| OLAP | DMR | n/a | No. |
| DMR | Canonical | n/a | No |
| OLAP | Canonical | n/a | No |

Validity of PMUN Translation

The PTC will translate a source PMUN into a target PMUN even when it is not provided with the information required to perform a valid translation. In such situations, the PTC will generate a target PMUN that is of the correct format, but it may not necessarily be valid within the context of the target data source provider.

These situations are discussed below in the context of each translation type.

General Translation Process

The first step of any PMUN translation is to determine the type of data source represented by the source PMUN and the target metadata reference, if the target model is available. If either data source represents an OLAP data source, the data source technology of the data sources is also ascertained.

To determine the data source type of the source PMUN, the PMUN translation component searches the source model for the dimension to which the PMUN belongs and from that, determines the data source with which the dimension is associated.

To determine the data source type of the target data source, if present, the PMUN translation performs a similar search of the target model for the dimension referenced by the supplied dimensional target reference.

If the underlying data source technology is OLAP, then the translation component is also obtained from the model, or one of its sub-components, the identification of the underlying data source technology.

If a PMUN contains a DSI portion then a PMUN was initially created from an OLAP data source. In this case, the PMUN translation component obtains the data source technology identifier from the DSI portion of the PMUN.

Figure 5:
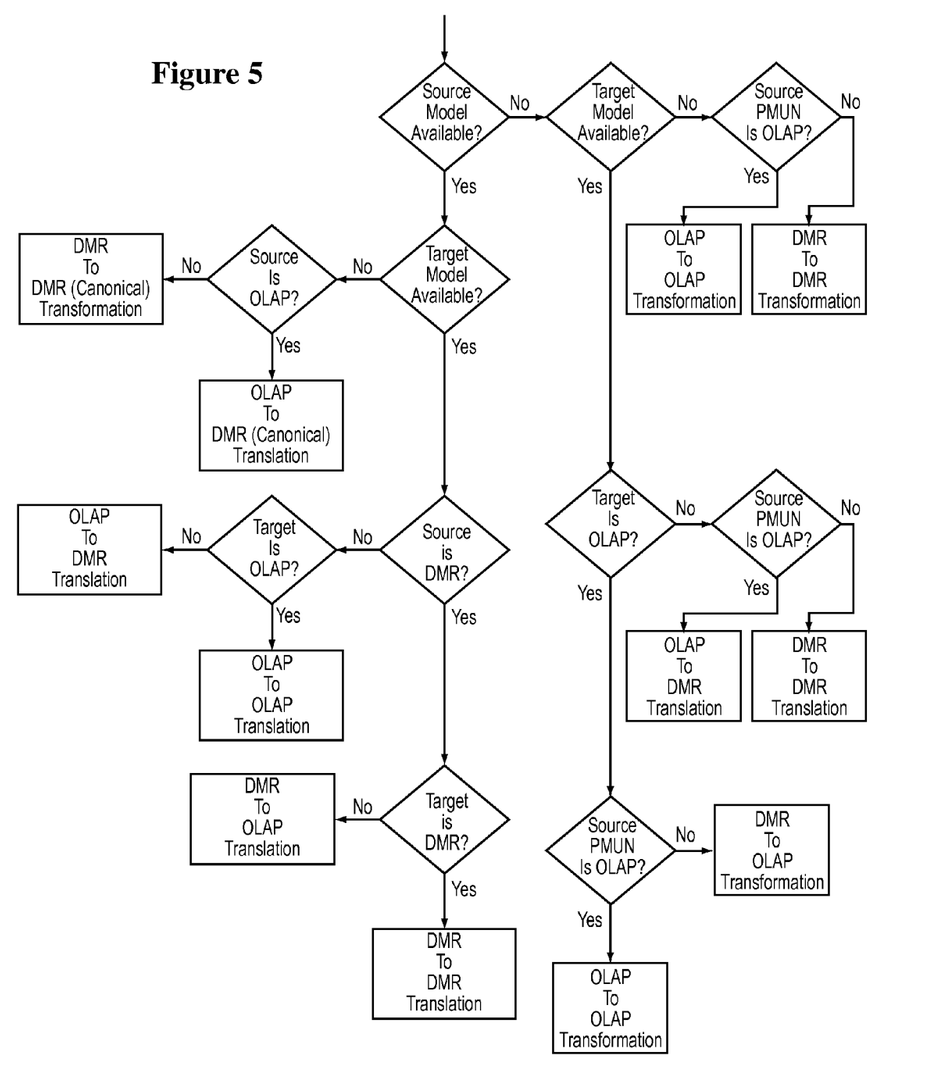
FIG. 5 is a flowchart illustrating an example method of PMUN translation.

FIG. 5 shows in a flowchart an example of a method of PMUN translation.

DMR to DMR

A PMUN created from a DMR data source contains a model reference and the list of business key values that correspond to a particular member. If the target data source is another DMR data source, then the underlying data source provider accepts the same form of a PMUN, regardless of the relational data base technology. To complete the PMUN translation, the source model reference portion of the source PMUN is replaced with that of the target model reference supplied as a parameter value to the PTC.

If the target model is not available to the PMUN translation module, this translation is still correct if the target data source is DMR since an underlying requirement is that the business key values representation are consistent across DMR data sources.

Figure 6:
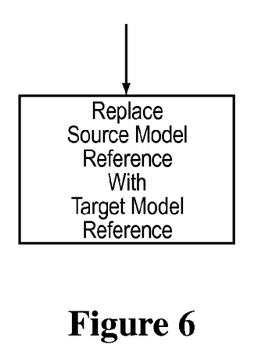
FIG. 6 is a flowchart illustrating an example method of DMR to DMR PMUN translation.

FIG. 6 shows in a flowchart an example of a method of DMR to DMR PMUN translation.

OLAP to OLAP (Same Technology)

If the source PMUN is from an OLAP data source and the target dimensional reference corresponds to an OLAP data source, the PMUN translation component performs a comparison of the two data source technology identifiers. If they are the same, then the target PMUN is created by replacing the model reference portion of the source PMUN with that of the model reference supplied as a parameter value to the PMUN translation component.

If the target model is not available to the PMUN translation module, this translation is still correct if the target data sources are of the same data source technology because the DSIs are identical based on the data warehouse requirements stated earlier.

OLAP to OLAP (Different Technology)

If the source PMUN is from an OLAP data source and the target dimensional reference corresponds to an OLAP data source, the PMUN translation component performs a comparison of the two data source technology identifiers.

If they are different one of two processes is triggered:

If the original PMUN contains the second, canonical section, then
- The PMUN translation component executes a metadata query against the underlying data source provider, starting at the left-most business key value of this section, to obtain the data source MUN represented by this business key value.
- If this search returns a member reference, the PMUN translation component then executes a search within the direct descendants of the member for a member with the second business key value. This process is repeated until the final business key value is used in a search that returns the member that represents the equivalent of the source member in the target data source.

If the search is successful, a new PMUN is created from the following three components:
- The target model reference
- The canonical business key section of the source PMUN
- The target data source identifier and target DSI.

If any of these member searches fail, an error is thrown by the PMUN translation component indicating that the target data source does not contain an equivalent of the source PMUN.

If the source PMUN does not contain the canonical business key section, the PMUN translation component can be designed to support the dynamic construction of the canonical section from the target PMUN conversion. This involves the following steps:
- A metadata query is performed against the underlying data source of the source PMUN to obtain the direct ancestor of the member as well as the business key associated with the member. The value of this business key becomes the right-most business key value in the canonical identifier for the member.

Another member search is performed on the ancestor returned by the query to obtain its parent and business key value if the previous member occurs at a non-unique level. The business key value is pre-pended to the existing business key value. This process is repeated until no parent is returned by the member search or the member returned occurs at a unique level. The result is a canonical identifier of the member.

At this point, the PMUN translation component has collected the information required to apply the translation algorithm it employed when the source PMUN contained the canonical section.

In the absence of access to the source and target models, the PTC returns the same PMUN as was supplied for translation if the OLAP PMUN that does not contain a canonical key section. Such a "translation" can succeed if the two data sources happen to be the same, though this is unknown in such situations to the PTC. If the target data source is a DMR or another OLAP data source technology, the PMUN created will not be valid for the target data source.

Figure 7:
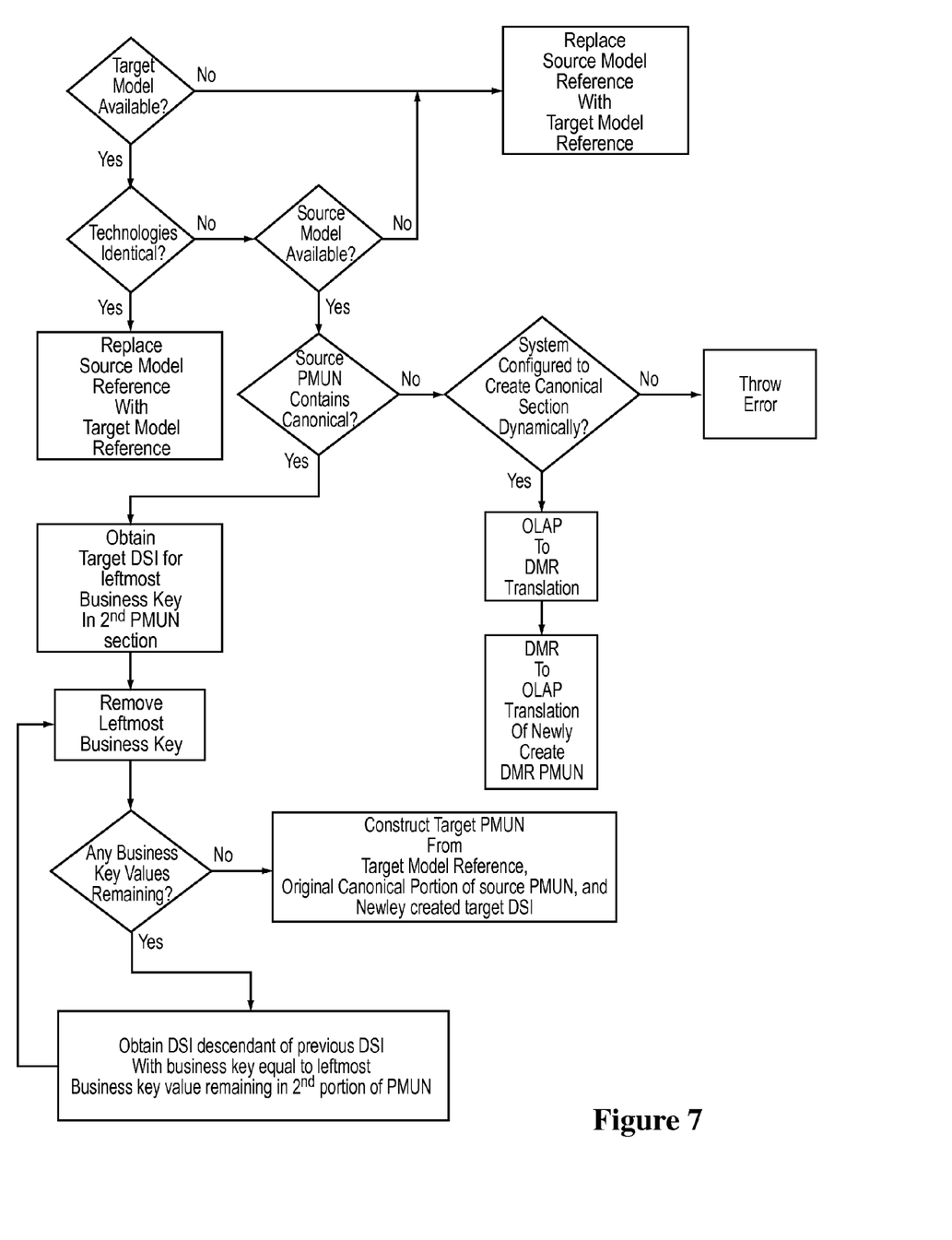
FIG. 7 is a flowchart illustrating methods for both forms of OLAP to OLAP PMUN translation.

FIG. 7 shows in a flowchart methods for both forms of OLAP to OLAP PMUN translation.

DMR to OLAP

A PMUN created from a DMR data source contains the canonical business key section required to construct an OLAP PMUN. The translation applied is the same as that of an OLAP to OLAP PMUN translation for different OLAP technologies when the source PMUN contains the canonical section.

If the target model is not available to the PMUN translation module, this translation is still correct since the target PMUN contains its canonical section.

Figure 8:
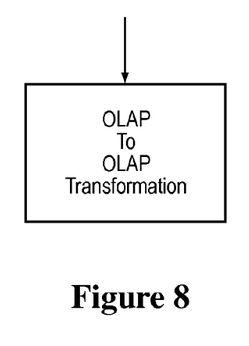
FIG. 8 is a flowchart illustrating an example of a method of DMR to OLAP translation.

FIG. 8 shows in a flowchart an example of a method of DMR to OLAP translation.

OLAP to DMR

Converting OLAP to DMR involves one of three processes:

1. If the source OLAP PMUN contains the canonical section, then the target PMUN is constructed as follows:

The first section contains the target dimensional reference supplied as a parameter to the PMUN translation component.

The second section is obtained from the second section of the source PMUN.

2. If the OLAP PMUN does not contain the canonical section, the translation module can be configured to dynamically create a canonical section. If the translation module is so configured, this operation is performed just as it was for OLAP to OLAP PMUN conversion for different data source technologies when the source PMUN does not contain the canonical section. The only difference is that the target OLAP MUN does not have to be resolved. Instead, once the canonical representation has been resolved, the target PMUN is constructed as follows:

The first section contains the target dimensional reference supplied as a parameter to the PMUN translation component.

The second section is obtained from the dynamically created canonical business key section.

If the target model is not available to the PMUN translation module, this translation is still correct if the target PMUN after translations contains its canonical section.

3. If the OLAP PMUN does not contain the canonical section and the translation module is not configured to dynamically create a canonical section, the translation module will throw an error indicating an unsuccessful PMUN translation.

Figure 9:
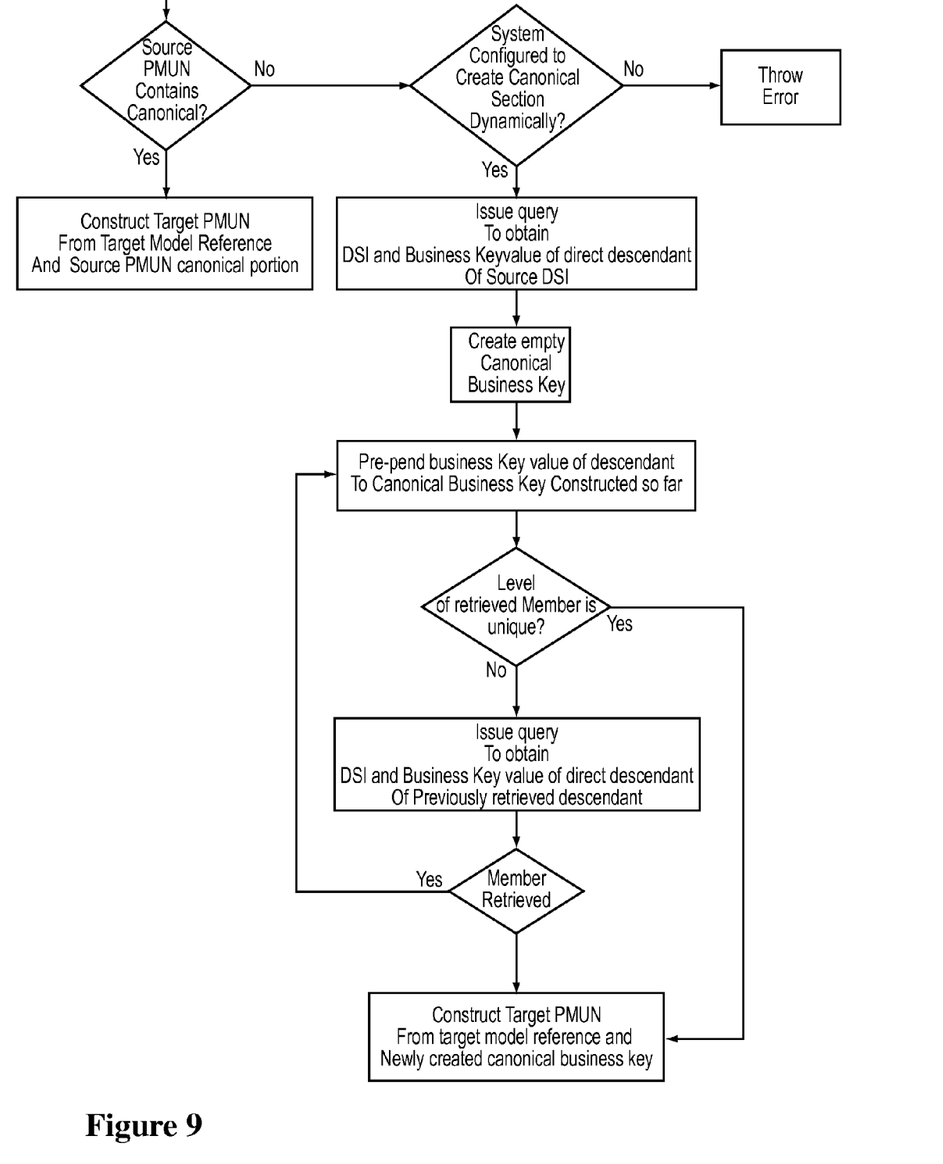
FIG. 9 is a flowchart illustrating an example of a method of DMR to OLAP PMUN translation.

FIG. 9 shows in a flowchart an example of a method of DMR to OLAP PMUN translation.

DMR to Canonical

If the target model reference is not available, then the target PMUN in this case is that same as that for DMR to DMR translation. The target PMUN is consumable by target data sources.

OLAP to Canonical

If the target model reference is not available, then the target PMUN in this case is that same as that for OLAP to DMR translation. The target PMUN is consumable by target data sources.

Query Execution

When a query is executed, a sub-component of the data access component (not part of the current invention) evaluates the context in which each PMUN occurs. If the PMUN is not appropriate for the context in which the PMUN occurs, then this sub-component invokes the PMUN translation component to convert the PMUN into a PMUN format supported by the underlying data source provider. If any of the PMUNs that require translation cannot be converted, the sub-component performing the PMUN evaluation of a query throws an exception indicating that a PMUN in the original query is invalid or not found in the target data source.

If the PMUNs requiring translation are successfully translated, the original PMUNs in the query are replaced by their translations and the resulting query is issued to the corresponding underlying data source provider.

Figure 12:
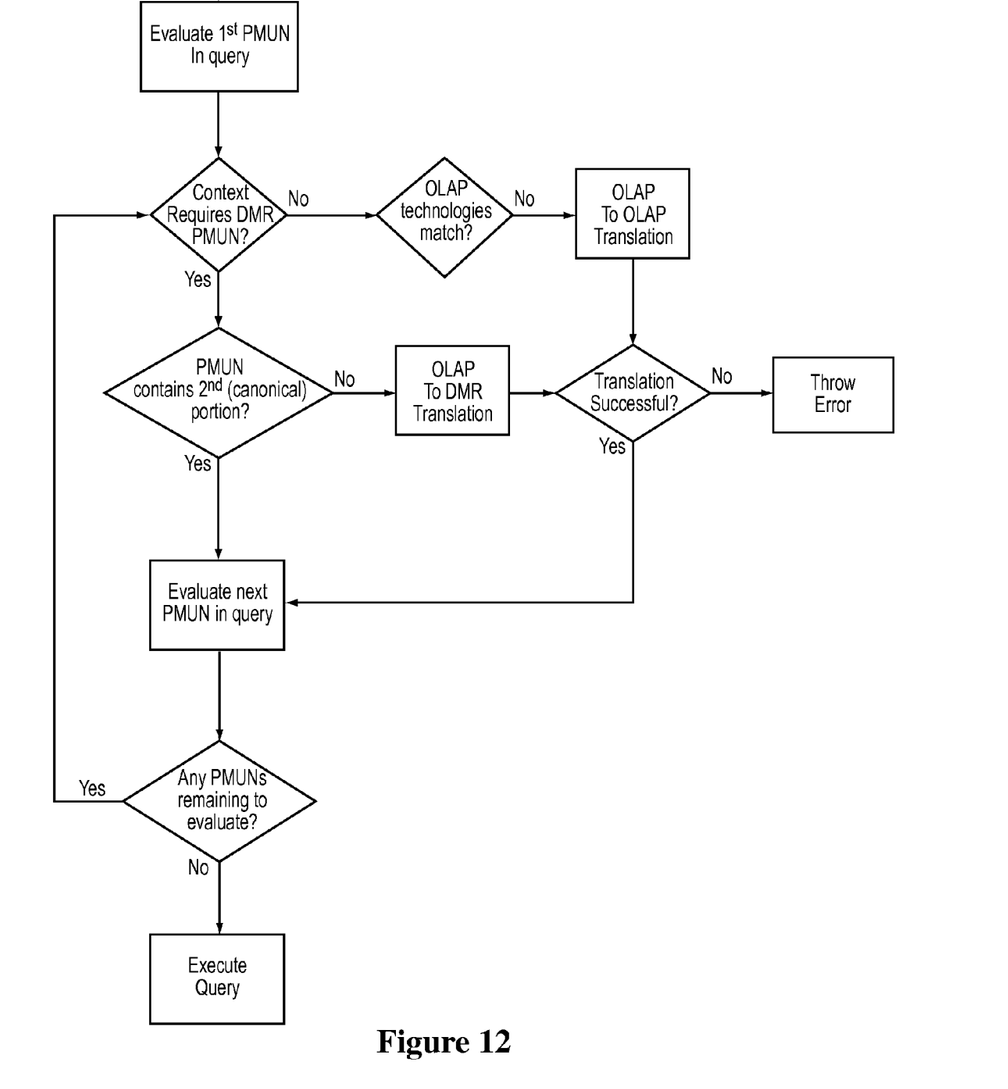
FIG. 12 is a flowchart illustrating an example of a method applied by the query execution component to translate PMUNs.

FIG. 12 shows in a flowchart an example of a method applied by the query execution component to translate PMUNs.

Master/Detail Reports

The same sub-component that performs evaluation of PMUNs within a single query also performs analysis of the PMUNs supplied as parameter values to a detail query in the scope of a master/detail report. If a PMUN requires translation, the sub-component invokes the PMUN translation component, complete with references to both the source and target models.

Figure 13:
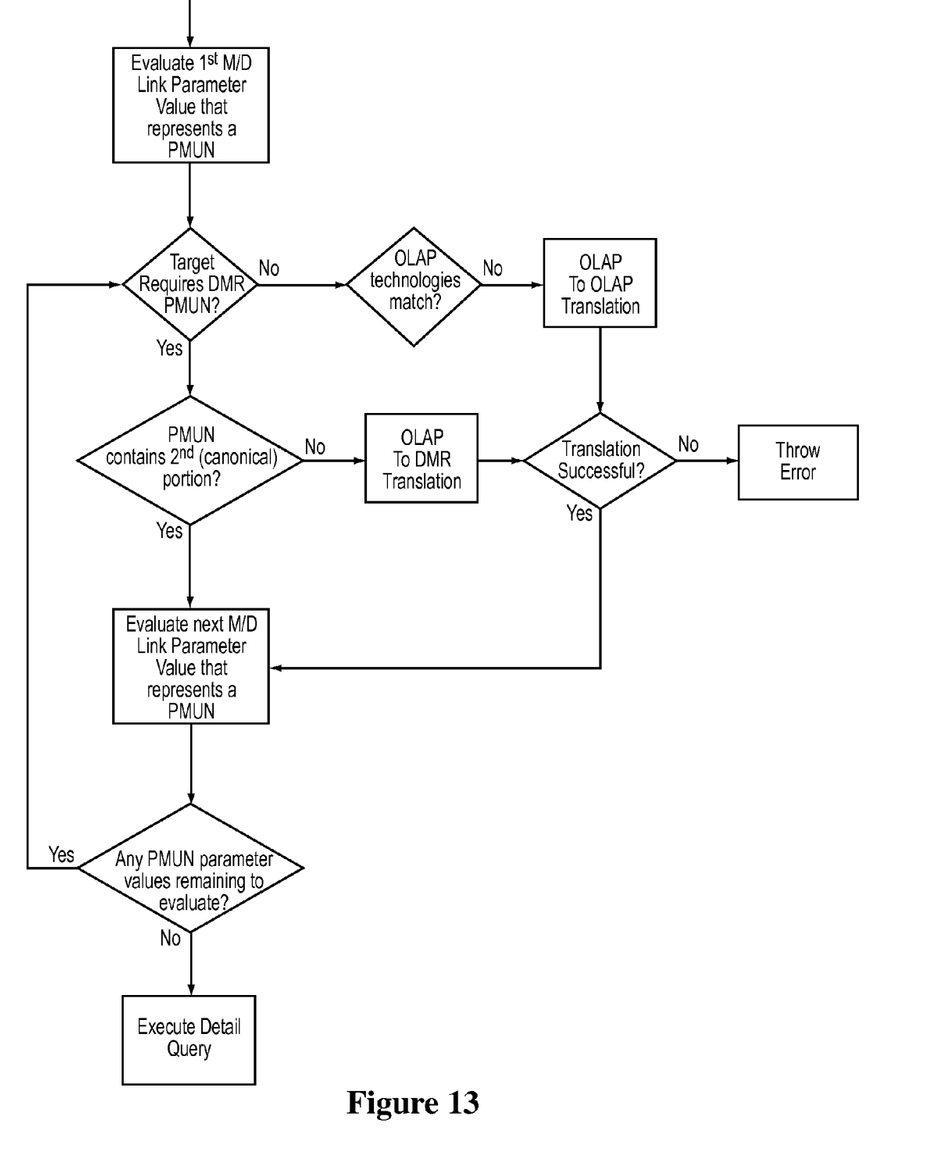
FIG. 13 is a flowchart illustrating an example of a method applied to perform PMUN translation in the realm of master/detail reports.

FIG. 13 shows in a flowchart an example of a method applied to perform PMUN translation in the realm of master/detail reports.

Drill Through

As described earlier, drill-through is a specification of a linkage between a source and a target report and as a consequence, between the source and target data queries that underpin those reports. The target report is parameterized in order to be executed within the context of the source report. If any of the parameters of the target report represent PMUNs, the source values supplied for those parameters are also PMUNs.

The manifestation of drill-through functionality is provided by another sub-component of the data access component (not part of the current invention). The drill through component does not have any knowledge of the data source(s) related to a target report. As a consequence, the drill-through manager attempts to provide to the target report a PMUN that is most likely to be supported by the target data source. This means that the PMUN supplied to the target report ideally contains the business key section.

For PMUNs created from DMR data sources, this section is present. Depending upon a system's configuration, OLAP PMUNs may also contain this section. If the section is not present, the system may be configured to create the business key section of the PMUN is created or not. If it is so configured, then a canonical PMUN can always be supplied as a drill through parameter value. Otherwise, the success of the drill through operation is dependent upon the data source technology of the target report being the same as that of the source PMUN parameter.

In the scope of the execution of the target report, there is no model reference provided for the source PMUN and the success of the translation of the source (parameter) PMUN to a target PMUN is based on the success of the translations described above.

Figure 14:
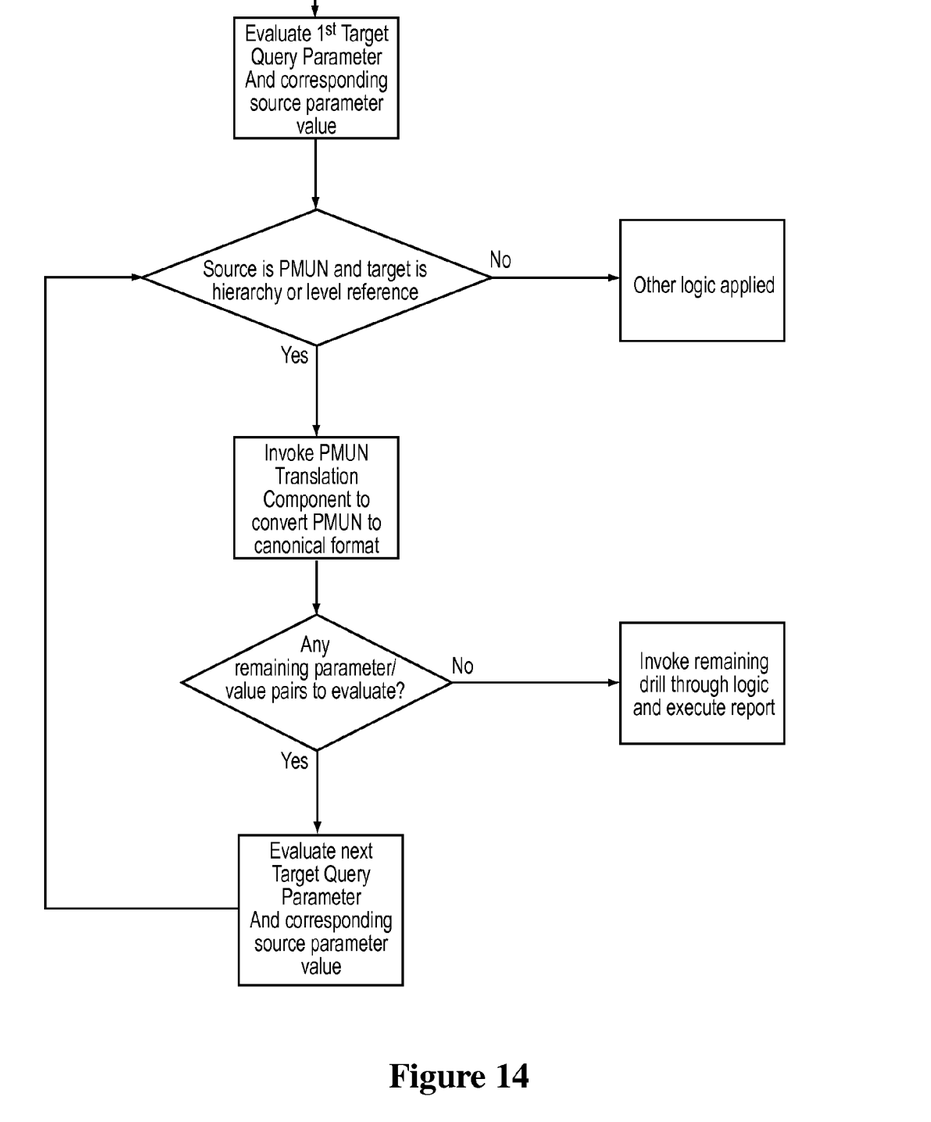

FIG. 14 shows in a flowchart an example of a method applied to perform PMUN translation in the realm report to report drill through.

Implementation of the Invention

As an example of the implementation of this invention, a data access component that embodies most of the concepts described in this invention is further described. The data access component is called the Data Access and Modeling runtime component (DA&M runtime). Within this component are the following sub-components, listed along with their counterpart in the invention described above:

| Example Implementation Component | Invention Component |
|---|---|
| Query Framework (QFW) | Query Execution Component |
| Relational Query Provider (RQP) | Relational Data Source Provider |
| OLAP Query Provider (OQP) | OLAP Data Source Provider |
| Multi-Dimensional Data Service (MDDS) data source providers | OLAP Data Sources |
| Universal Data Access (UDA) | Relational Data Sources |
| Metadata Query Planner (MQP) | PMUN Translation Component |
| Drill Through Planner (DTP) | Drill Through Manager |

In this environment, what is referred to in the implementation as PMUNs are commonly referred to as Cognos MUNs. The example implementation components in this implementation have the following characteristics:

Cognos MUNs created by OQP do not include the canonical second portion of the PMUN.

RQP does not support the concept of parent/child hierarchies and as a consequence does not support the creation of the corresponding Cognos MUNs.

MQP is configured to dynamically create the canonical second portion of a Cognos MUN in the case of OLAP to DMR, but not in the case of OLAP to OLAP (different technology) translations.

Because OLAP Cognos MUNs do not contain the canonical portion, the example implementation does not support the following operations:

Drill through from OLAP to OLAP where the OLAP technologies differ.

Master/detail where the master and detail queries are posed against different OLAP technologies.

The systems and methods according to the present invention may be implemented by any hardware, software or a combination of hardware and software having the functions described above. The software code, either in its entirety or a part thereof, may be stored in a computer readable memory. Further, a computer data signal representing the software code that may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A member unique name (MUN) translation system comprising:
 a computer-readable storage medium comprising instructions for a translation module; and
 a processor configured to execute the translation module to receive a first MUN that identifies a member of a first data source, the first MUN comprising a set of model information that describes a logical model for the first data source, to compare a data source identifier for the first data source to a data source identifier for a second data source, and, when the data source identifier for the first data source is the same as the data source identifier for the second data source, to copy the set of model information of the first MUN into a second MUN that identifies a member of the second data source corresponding to the member of the first data source, and wherein the data source identifier for the first data source indicates that the first data source comprises at least one of an Online Analytic Processing (OLAP) data source, a dimensionally modeled relational (DMR) data source, and a canonical data source.

2. A method comprising:
 receiving, by a computing device, a first member unique name (MUN) that identifies a member of a first data source, the first MUN comprising a set of model information that describes a logical model for the first data source;
 comparing, by the computing device, a data source identifier for the first data source to a data source identifier for a second data source, wherein the data source identifier for the first data source indicates that the first data source comprises at least one of an Online Analytic Processing (OLAP) data source, a dimensionally modeled relational (DMR) data source, and a canonical data source; and
 when the data source identifier for the first data source is the same as the data source identifier for the second data source, copying, by the computing device, the set of model information for the first MUN into a second MUN that identifies a member of the second data source corresponding to the member of the first data source.

3. A computer-readable storage medium comprising instructions that, when executed, cause a processor to:
 receive a first member unique name (MUN) that identifies a member of a first data source, the first MUN comprising a set of model information that describes a logical model for the first data source;
 compare a data source identifier for the first data source to a data source identifier for a second data source, wherein the data source identifier for the first data source indicates that the first data source comprises at least one of an Online Analytic Processing (OLAP) data source, a dimensionally modeled relational (DMR) data source, and a canonical data source; and
 when the data source identifier for the first data source is the same as the data source identifier for the second data source, copy the set of model information for the first MUN into a second MUN that identifies a member of the second data source corresponding to the member of the first data source.

4. The system of claim 1, wherein the logical model identifies one or more of a dimension, a hierarchy, a level, and a measure of the first data source.

5. The system of claim 1, wherein the first MUN comprises the data source identifier for the first data source.

6. The system of claim 1, wherein when the data source identifier for the first data source indicates that the first data source comprises an OLAP data source, the data source identifier for the first data source further indicates a particular OLAP data source technology for the first data source.

7. The method of claim 2, wherein the logical model identifies one or more of a dimension, a hierarchy, a level, and a measure of the first data source.

8. The method of claim 2, wherein the first MUN comprises the data source identifier for the first data source.

9. The method of claim 2, wherein when the data source identifier for the first data source indicates that the first data source comprises an OLAP data source, the data source identifier for the first data source further indicates a particular OLAP data source technology for the first data source.

10. The computer-readable storage medium of claim 3, wherein the logical model identifies one or more of a dimension, a hierarchy, a level, and a measure of the first data source.

11. The computer-readable storage medium of claim 3, wherein the first MUN comprises the data source identifier for the first data source.

12. The computer-readable storage medium of claim 3, wherein when the data source identifier for the first data source indicates that the first data source comprises an OLAP data source, the data source identifier for the first data source further indicates a particular OLAP data source technology for the first data source.

* * * * *